United States Patent
Rakshit

(10) Patent No.: US 11,277,358 B2
(45) Date of Patent: Mar. 15, 2022

(54) CHATBOT ENHANCED AUGMENTED REALITY DEVICE GUIDANCE

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 69 days.

(21) Appl. No.: 16/804,028

(22) Filed: Feb. 28, 2020

(65) Prior Publication Data
US 2021/0273892 A1    Sep. 2, 2021

(51) Int. Cl.
H04L 51/04 (2022.01)
H04L 51/02 (2022.01)
G06N 5/02 (2006.01)
G06F 16/953 (2019.01)
G06T 19/00 (2011.01)

(52) U.S. Cl.
CPC ........... *H04L 51/02* (2013.01); *G06F 16/953* (2019.01); *G06N 5/02* (2013.01); *G06T 19/006* (2013.01)

(58) Field of Classification Search
None
See application file for complete search history.

(56) References Cited

U.S. PATENT DOCUMENTS 11,159,457 B2 * 10/2021 Liang ................. G06N 5/04
2014/0310595 A1   10/2014 Acharya
2017/0236407 A1 * 8/2017 Rhoads ............... G06F 16/29
                                                          455/420
2017/0250930 A1   8/2017 Ben-Itzhak
2018/0342106 A1   11/2018 Rosado
2019/0268473 A1 * 8/2019 Amir ................. G06T 11/60
(Continued)

FOREIGN PATENT DOCUMENTS

WO    2015192117 A1    12/2015

OTHER PUBLICATIONS

Brooke, Sophia, "Robots, Chatbots, and Augmented Reality: The Future of Travel", Jun. 4, 2018, 3 pages, <https://chatbotsmagazine.com/robots-chatbots-and-augmented-reality-the-future-of-rvel-26cb2f24ca8d>.

(Continued)

*Primary Examiner* — June Y Sison
(74) *Attorney, Agent, or Firm* — Joseph P. Curcuru

(57) ABSTRACT

In an approach to interact with a chatbot through an augmented reality device. Embodiments consist of receiving a query from a user including a video feed, collecting visual information from the video feed, and determining additional visual information is required to respond to the query. Further, embodiments consist of dynamically identifying the additional visual information that is required, providing activity instructions to the user on how to collect the additional visual information in the form of a new video feed, and directing user actions via an augmented reality device while the user collects the additional visual information according to the activity instructions. Additionally, embodiments consist of identifying, in a knowledge corpus, a recommended response to the query based on the visual information from the video feed and the additional visual information from the new video feed, and presenting, via the augmented reality device, the recommended response to the user.

20 Claims, 4 Drawing Sheets

(56) References Cited

U.S. PATENT DOCUMENTS

2019/0282324 A1 9/2019 Freeman
2021/0134270 A1* 5/2021 Rakshit .................... G06F 3/01
2021/0241456 A1* 8/2021 Adiri .................... G06K 9/4661

OTHER PUBLICATIONS

Menzheres, Alexander, "Combination of Augmented Reality with Chatbots for Customized Online Experience", Feb. 27, 2018, © 2019 eTeam, 6 pages, <https://www.eteam.io/blog/ar-with-chatbots/>.

Van De Ven, Frank, "Identibot: combining AI and AR to create the future of shopping", Jan. 31, 2018, 5 pages, <https://chatbotslife.com/identibot-combining-ai-and-ar-to-create-the-future-of-shopping-e30e726ed1c1>.

* cited by examiner

200

User: I am unable to identify where the vibration is occurring on the microwave.

Chatbot: Please scan the barcode or enter the microwave make and model number.

User: The product's make and model is a Microwave 2000.

Chatbot: *Video Capturing* has been activated. Please try and keep the microwave in focus.

Run the microwave for 10 seconds.

Please open the microwave door, slowly swing the microwave door for 5 seconds, remove the glass plate, close the microwave door, and run the microwave for 10 seconds.

When complete just state that you have completed the assigned tasks or select the "completed" display prompt.

FIG. 2

CHATBOT ENHANCED AUGMENTED REALITY DEVICE GUIDANCE

BACKGROUND OF THE INVENTION

The present invention relates generally to the field of augmented reality, and more particularly to integrating artificial intelligence (AI) based chatbot with augmented reality.

Augmented reality (AR) is an interactive and augmented experience of a real-world environment where the objects that reside in the real world are enhanced by computer-generated perceptual information, sometimes across multiple sensory modalities, including visual, auditory, haptic, somatosensory, and olfactory. AR can be defined as a system having three basic features: a combination of real and virtual worlds, real-time interaction, and accurate 3D registration of virtual and real objects. The overlaid sensory information can add to the natural environment, or mask of the natural environment. The AR experience can be seamlessly interwoven with the physical world such that it is perceived as an immersive aspect of the real environment. In this way, augmented reality alters an ongoing perception of a real-world environment, whereas virtual reality completely replaces the real-world environment with a simulated or virtual one. Augmented reality is related to two largely synonymous terms: mixed reality and computer-mediated reality.

A chatbot is a piece of software that conducts a conversation via auditory or textual methods. Such programs are often designed to convincingly simulate how a human would behave as a conversational partner. Chatbots are typically used in dialog systems for various practical purposes including customer service or information acquisition. Some chatbots use sophisticated natural language processing systems, but many simpler ones scan for keywords within the input, then retrieve a reply with the most matching keywords, or the most similar wording pattern, from a database.

SUMMARY

Embodiments of the present invention disclose a method, a computer program product, and a system for chatbot interaction through an augmented reality device, the embodiments comprise: receiving a query from a user including a video feed; collecting visual information from the video feed; determining additional visual information is required to respond to the query; dynamically identifying the additional visual information that is required; providing activity instructions to the user on how to collect the additional visual information in the form of a new video feed; directing user actions via an augmented reality device while the user collects the additional visual information according to the activity instructions; identifying, in a knowledge corpus, a recommended response to the query based on the visual information from the video feed and the additional visual information from the new video feed; and presenting, via the augmented reality device, the recommended response to the user.

BRIEF DESCRIPTION OF THE DRAWINGS

FIG. 2 is a screen shot example that illustrates an AI chatbot components interaction with a user via an AR device;

DETAILED DESCRIPTION

Figure 1:
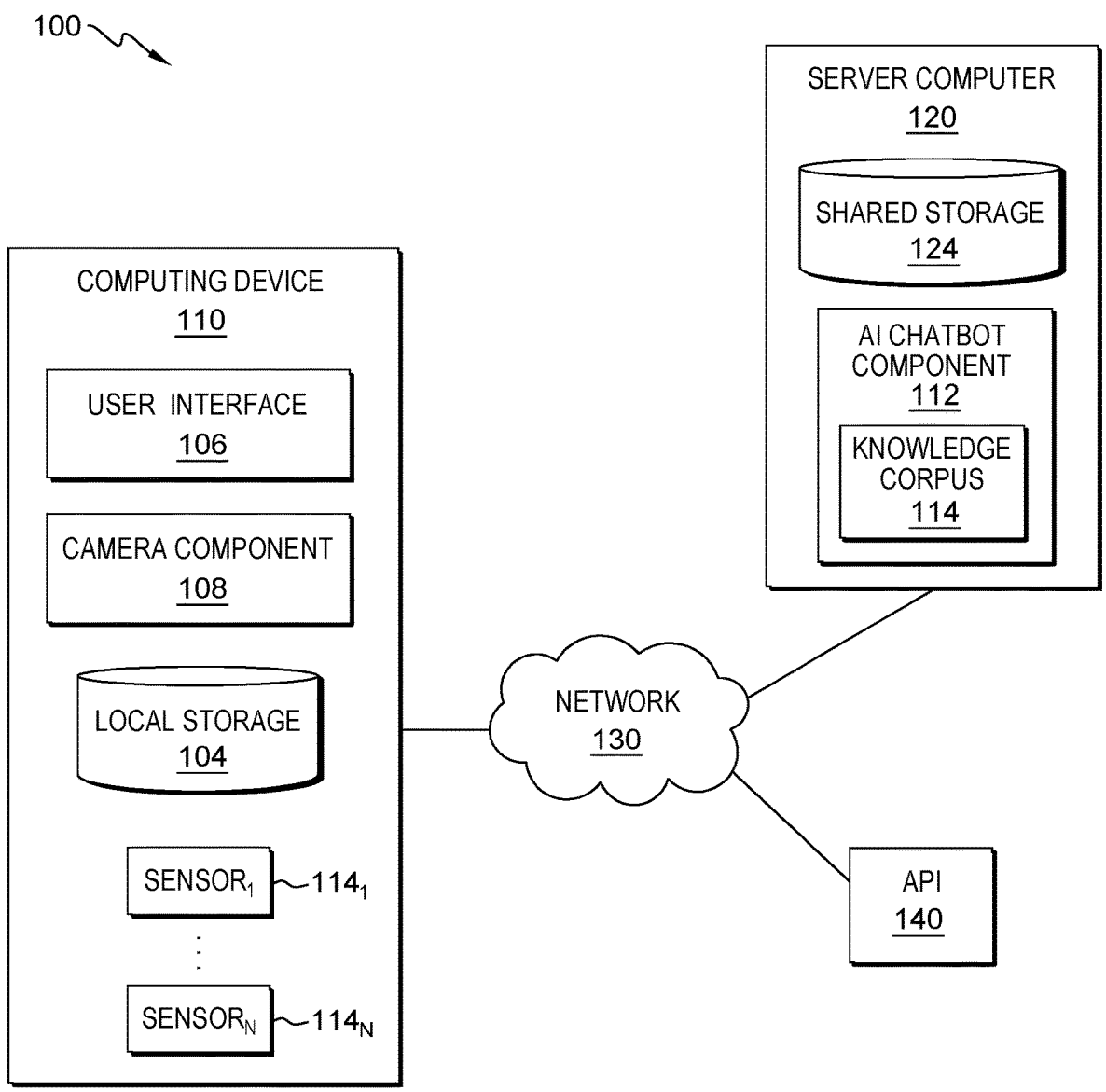
FIG. 1 is a functional block diagram illustrating a distributed data processing environment, in accordance with an embodiment of the present invention.

AI based chatbots enable a user to perform textual and/or auditory interaction (i.e., user interaction) to solve various problems, such as: troubleshooting technical issues in machines or computers, or gather information to perform an activity (e.g., installing a program, pruning a tree, identifying an animal species, etc.). Embodiments of the present invention perform natural language processing on requests and responses received as input. A knowledge corpus visually displays information in the form of step by step instructions (i.e., assigned tasks/activity instructions) displayed on an augmented reality device (e.g., augmented reality glasses). An augmented reality device can enable the user to interact with the AI based chatbot, wherein information can be directly presented to a user viewing the augmented reality glasses. Embodiments of the present invention can improve the art of augmented reality and AI based chatbots by capitalizing on the communication between one or more chatbots and an augmented reality device to solve problems (i.e., user queries) and help a user perform an activity more efficiently. Embodiments of the present invention can enable a user to perform an activity more efficiently by dynamically instructing the user to adjust the user's actions and/or body position while providing instructions responsive to a query. Some embodiments of the present invention retrieve step by step instructions for performing an activity (activity instructions) from a knowledge corpus and/or from an internet (i.e., online) search engine.

Embodiments of the present invention can pair with one or more augmented reality devices. Embodiments of the present invention can collect visual information from a user's surrounding area, via video feeds and/or images captured by the one or more augmented reality devices. Visual Information is information such as specific objects and/or people that are identified by embodiments of the present invention around the target area from received video feeds or images using visual image analysis. Additional details associated with a user query can be identified by retrieving visual information from the received video feeds and/or images. Embodiments of the present invention can participate in auditory and/or textual interaction with the user via the one or more augmented reality devices. Embodiments of the present invention can analyze the collected visual information and user input of a particular problem (i.e., user query) to respond the user query with specific guidance. User input can be a user's query, a user's responses to chatbot questions or prompts, and/or any details or information describing the problem or activity the user wants solved or performed. A user query can be any question, requested assistance, activity and/or problem a user is having. Responses may answer a question and/or provide guidance/instructions on resolving an issue or completing a task, event, and/or activity. Embodiments of the present invention can search a knowledge corpus and/or access an internet search engine to identify solutions to a user query.

During analysis of the visual surroundings of a problematic area (i.e., target area), embodiments of the present invention can communicate with one or more augmented reality devices to display visual guidance associated with the user's focus direction navigate around the target areas. In this case, the visual guidance can instruct the user, via a visual or auditory prompt, to change the focus direction (e.g., pan left, pan right, speed of movement of the focus direction, duration of focus or holding focus on a particular area of the target area or surrounding area, etc.). The visual guidance enables the AI chatbot to gather visual contents associated with the target area. Embodiments of the present invention can analyze the received video feed from one or more augmented reality devices on a real-time basis.

Embodiment of the present invention, via one or more knowledge corpus, can dynamically identify insufficiency information from the received video feed to diagnose the identified and/or stated problem. Embodiments of the present invention can predict one or more focus navigation plans for the user, wherein a focus navigation plan is a plan that outlines and/or lists where the user should look (i.e., user focus instructions) in order to capture video and/or photos of the target area. Embodiments of the present invention can display and/or communicate the same user focus instructions to the user, via the computing device. Embodiments of the present invention can dynamically update the user focus instructions based on identified issues in the received media (e.g., live and/or recorded video feed and/or images).

Embodiments of the present invention can communicate with one or more augmented reality devices, in which embodiments of the present invention can display visual guidance to a user, via the one or more augmented reality devices, to perform instructed actions while navigating the user's focus around a target area. Embodiments of the present invention can communicate with a knowledge corpus. The knowledge corpus can recommend one or more solutions to the user, where the one or more solutions comprise identified actions (e.g., a list of user recommended actions) that can be visually presented to the user. Along with visual information about the target area, embodiments of the present invention can collect and store the user's biometric reaction feedback to understand if the identified problem is creating any impact to the user and various dimensions about the problem to provide solution recommendations.

Implementation of embodiments of the invention may take a variety of forms, and exemplary implementation details are discussed subsequently with reference to the FIGS. (i.e., FIG. 1-FIG. 3).

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110, server computer 120, and application programming interface (API) 140 interconnected over network 130.

Network 130 can be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and can include wired, wireless, or fiber optic connections. Network 130 can include one or more wired and/or wireless networks that can receive and transmit data, voice, and/or video signals, including multimedia signals that include voice, data, text and/or video data. In general, network 130 can be any combination of connections and protocols that will support communications between computing device 110 and server computer 120, and any other computing devices and/or storage devices (not shown in FIG. 1) within distributed data processing environment 100.

In some embodiments of the present invention, computing device 110 can be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 can be representative of any programmable computing device or a combination of programmable computing devices capable of executing machine-readable program instructions and communicating with users of other computing devices via network 130 and/or capable of executing machine-readable program instructions and communicating with server computer 120.

In some embodiments of the present invention, computing device 110 can represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 can include an instance of user interface (interface) 106, sensor 1141-N, camera component 108, and local storage 104. In various embodiments, not depicted in FIG. 1, computing device 110 can have a plurality of user interfaces. In other embodiments, not depicted in FIG. 1, distributed data processing environment 100 can comprise a plurality of computing devices, plurality of server computers, and/or one a plurality of networks. Computing device 110 can include internal and external hardware components, as depicted, and described in further detail with respect to FIG. 3.

In various embodiments, camera component 108 is executed on computing device 110. In some embodiments, camera component 108 can be located and/or executed anywhere within distributed data processing environment 100. Camera component 108 can be one or more cameras that are known in the art. In various embodiments, camera component 108 can provide live video feeds (video feed) of what the user is viewing to computing device 110 or more specifically to AI chatbot component (chatbot) 112. In various embodiments, chatbot 112 can enable computing device 110 to store the captured video feed and/or photographs to shared storage 124 and/or local storage 104. In various embodiments, camera component 108 is capable of recording, transmitting, and storing live or recorded videos and capable of taking, transmitting, and storing photographs. Camera component 108 can be one or more of a plurality of types of camera, including, but not limited to, pin-hole, stereo, omni-directional, non-central, infrared, video, digital, three dimensional, panoramic, filter-based, wide-field, narrow-field, telescopic, microscopic, and/or any other camera known in the art.

User interface (interface) 106 provides an interface to predictive chatbot 112. Computing device 110, via user interface 106, can enable a user and/or a client to interact with chatbot 112 and/or server computer 120 in various ways, such as sending program instructions, receiving program instructions, sending and/or receiving messages, updating data, sending data, inputting data, editing data, collecting data, and/or receiving data. In one embodiment, interface 106 can be a graphical user interface (GUI) or a web user interface (WUI) and can display at least text, documents, web browser windows, user options, application interfaces, and instructions for operation. interface 106 can include data (such as graphic, text, and sound) presented to a user and control sequences the user employs to control operations. In another embodiment, interface 106 can be a mobile application software providing an interface between a user of computing device 110 and server computer 120. Mobile application software, or an "app," can be designed to run on smart phones, tablet computers and other computing devices. In an embodiment, interface 106 can enable the user of computing device 110 to at least send data, input data, edit data (annotations), collect data and/or receive data.

A sensor is a device that detects or measures a physical property and then records or otherwise responds to that property, such as vibration, chemicals, radio frequencies, environment, weather, humidity, light, etc. Sensor $114_{1-N}$, herein sensor(s) 114, detect a plurality of attributes of a user of chatbot 112 and of the environment of the user. The detected plurality of attributes can be analyzed to determine the user's current conditions. As used herein, N represents a positive integer, and accordingly the number of scenarios implemented in a given embodiment of the present invention is not limited to those depicted in FIG. 1.

In some embodiments or the present invention, sensor(s) 114 include any device capable of imaging a portion of the electromagnetic spectrum. If computing device 110 is a wearable device, then sensor(s) 114 may include biometric sensors for detecting the physical condition of the user, such as blood pressure, heart rate, respiratory rate, calories burned, calories consumed, pulse, oxygen levels, blood oxygen level, glucose level, blood pH level, salinity of user perspiration, skin temperature, galvanic skin response, electrocardiography data, body temperature, eye tracking data, etc. Sensor(s) 114 can be one or more of a plurality of types of microphone for detecting speech and other audible sounds, such as voice prompts or notification. Sensor(s) 114 may be one or more of a plurality of types of gyroscopic sensors that can detect movement. Sensor(s) 114 may be one or more of a plurality of types of pressure sensors. Sensor(s) 114 may be able to detect weather conditions, such as air temperature, relative humidity, presence and type of precipitation, wind speed, etc., as user preferences may depend on the weather conditions. Sensor(s) 114 may be global positioning system (GPS) sensors. Sensor(s) 114 may be integrated into the vehicle of the user. Sensor(s) 1114 enable the collection of user data that can be retrieved by chatbot 112.

Server computer 120 can be a standalone computing device, a management server, a web server, a mobile computing device, one or more client servers, or any other electronic device or computing system capable of receiving, sending, and processing data. In other embodiments, server computer 120 can represent a server computing system utilizing multiple computers such as, but not limited to, a server system, such as in a cloud computing environment. In another embodiment, server computer 120 can represent a computing system utilizing clustered computers and components (e.g., database server computers, application server computers, etc.) that act as a single pool of seamless resources when accessed within distributed data processing environment 100. Server computer 120 can include internal and external hardware components, as depicted, and described in further detail with respect to FIG. 3.

Each of shared storage 124 and local storage 104 can be a data/knowledge repository and/or a database that can be written and/or read by one or a combination of chatbot 112, server computer 120 and computing device 110. In the depicted embodiment, shared storage 124 resides on server computer 120 and local storage 104 resides on computing device 110. In another embodiment, shared storage 124 and/or local storage 104 can reside elsewhere within distributed data processing environment 100, provided that each can access and is accessible by computing device 110 and server computer 120. Shared storage 124 and/or local storage 104 can each be implemented with any type of storage device capable of storing data and configuration files that can be accessed and utilized by server computer 120, such as, but not limited to, a database server, a hard disk drive, or a flash memory.

In some embodiments of the present invention, shared storage 124 and/or local storage 104 can each be a hard drive, a memory card, a computer output to laser disc (cold storage), and/or any form of data storage known in the art. In some embodiments, shared storage 124 and/or local storage 104 can each be one or more cloud storage systems and/or databases linked to a cloud network. In various embodiments, shared storage 124 and/or local storage 104 can access, store, and/or house user data, physical room data, and meeting data, and/or data shared throughout distributed data processing environment 100.

API 140 is an interface or communication protocol between different parts of a computer program intended to simplify the implementation and maintenance of software. API 140 can be a plurality of API's and can be any combinations of API's known in the art. In various embodiments of the present invention, API 140 can be located and/or executed anywhere within distributed data processing environment 100 as long as API 140 is connected to and/or communicates with computing device 110, chatbot 112 and/or server computer 120. In various embodiments of the present invention, API 140 can connect to computing device 110 to gather real-time video from computing device 110. In various embodiment of the present invention, chatbot 112 can instruct API 140 to receive one or more videos and/or video feeds from computing device 110 (e.g., augmented reality device glasses), wherein API 140 can connect to computing device 110 to gather real-time video from computing device 110 (e.g., augmented reality device glasses). In various embodiments of the present invention, during a user's interaction with chatbot 112, chatbot 112 can instruct API 140 to connect to computing device 110.

In various embodiments, chatbot 112 is executed on server computer 120. In other embodiments, chatbot 112 can be executed on computing device 110. In some embodiments, chatbot 112 can be located and/or executed anywhere within distributed data processing environment 100 as long as chatbot 112 is connected to and/or communicates with computing device 110, API 140 and/or server computer 120. In various embodiments, chatbot 112 can captured user biometric data, identified solutions, dialog between the user and chatbot 112, and/or received video feeds and/or images on local storage 104 and/or shared storage 124. In various embodiments of the present invention, chatbot 112 comprises knowledge corpus 114. Knowledge corpus 114 can be a smart spaces structure that consists of a set of shared resources including data and data processing function, which continuously performs data mining operations for extracting new knowledge and performing routine monitoring functions based on the target functions set by the user or smart space services.

In various embodiments of the present invention, chatbot 112, via machine learning, can create knowledge corpus 114 based on historically gathered data associated with problems or activities queried by the user, identified problems, textual and/or audio interactions between the user and chatbot 112, and/or identified solutions. Knowledge corpus 114 can predict, based on the contextual situation, user input, and received video feed, how a user will interact with objects within a target area. For example, determining and identifying how the user can move around in the target area, what objects or particular areas should be recorded, how a user will perform an activity or actions, predetermined time intervals of visual focus on objects and/or particular areas, and/or any other way a user might interact with objects that are known in the art).

In various embodiments of the present invention, knowledge corpus 114 can be created based on various sources of information on any particular domain previously accessed and/or stored in local storage 104 and/or shared storage 124 by chatbot 112 including retrieved data and user interaction. In various embodiments of the present invention, chatbot 112 can create knowledge corpus 114 by storing user interactions (e.g., conversations between chatbot 112 and a user) and received or collected data associated with user queries and analyzed video feeds on to local storage 104 and/or shared storage 124. In various embodiments of the present invention, chatbot 112 cam analyze historically gathered videos, images, and documents (e.g., captured user dialog and/or retrieved instructions or explanations), wherein chatbot 112 can create knowledge corpus 114 based on the analyzed videos, images, and documents using machine learning.

In various embodiments of the present invention, knowledge corpus 114 can support the user with textual or audio interaction by retrieving information from an internet search engine and/or information stored on local storage 104 and/or shared storage 124. Knowledge corpus 114 can also receive image and video feeds related to a particular domain/topic. In various embodiments of the present invention, knowledge corpus 114 can identify, through video and image analysis, objects present in the video and/or images (i.e., image object associations can be identified). In various embodiments of the present invention, knowledge corpus 114 can analyze received image and/or videos to understand and identify the user's query by identifying and retrieving information similar or associated with the identified visual information. In various embodiments of the present invention knowledge corpus 114 can determine and output solutions or actions steps for the user for the identified user problem and/or user activity based on the identified user query and identified and retrieved information associated with the identified visual information.

In various embodiments of the present invention, chatbot 112 can analyze the contents of the received video feed from computing device 110 (i.e., video contents). In various embodiments of the present invention, chatbot 112 can analyze video contents based on video capturing settings, wherein video capturing setting comprise but are not limited to: pixel quality, focus, sharpness, color, tint, shade, and saturation. In various embodiments of the present invention, chatbot 112 can identify insufficient video content based on the video capturing settings, wherein insufficient video content is unable to interpret, identify, and/or analyze one or more portions of the received video. For example, minutes 2-3 of the received video are insufficient because they are out of focus and chatbot 112 is unable analyze and/or unable to identify video content. In another example, minutes 5-6 are insufficient because the video is too dark for chatbot 112 to analyze.

In various embodiments of the present invention, to remedy the identified insufficient video portion(s) chatbot 112 can identify: how long the camera has to be held in a particular area, the direction the user is looking, the speed the user can change visual focus to another particular area, and/or how close the user can zoom in on an object or particular area. In various embodiments of the present invention, chatbot 112 can capture and/or receive a live video feed of the user performing a specific activity or instructed action output by chatbot 112. For example, instructing the user to hold the focus in a particular area for a predetermined amount of time, while the user replaces the motherboard.

In various embodiments of the present invention, chatbot 112 can record a user performing an activity, wherein the recorded user activity can be played back for reference. In some embodiments of the present invention, chatbot 112 can produce step by step instructions (i.e., assigned tasks/activity instructions) to the user based on the recorded user activity. For example, if a user disassembles a computer then chatbot 112 will produce step by step instructions detailing how the user disassembled the computer. In various embodiments of the present invention, chatbot 112 can produce step by step instructions to the user based on the recorded user activity, wherein the step by step instructions operate in reverse. For example, if a user disassembles a computer then chatbot 112 will produce step by step instructions of how to assemble the computer based on how the user disassembled the computer starting with the last step and working backwards.

In various embodiments of the present invention, chatbot 112 can analyze how the video can be captured (e.g., high quality, low quality, etc.). In various embodiments of the present invention, while chatbot 112 interacts with a user via textual, audio, or visual prompts, chatbot 112 can receive user input that can explain and identify the problem (i.e., user query) the user is experiencing. Accordingly, chatbot 112 can provide suggestions, recommendations, and/or solutions to the user's problem or explain step by step how to perform an activity. In various embodiments of the present invention, if chatbot 112 determines that the information provided by the user is not sufficient (i.e., insufficient) to understand the user's query, then chatbot 112 analyzes the video and can identify one or more portions or aspects of the received video that are insufficiently captured. Insufficiently captured video is a video or portions of a video that are out of focus and/or result in chatbot 112 being unable to analyze the video in anyway known in the art. In various embodiments of the present invention, chatbot 112 can instruct the user to record a new video feed to replace and/or correct the identified insufficient video and/or video portions of the received or captured video/video feed.

For example, there is a problem with a microwave oven, the microwave door is creating vibration or vibration is occurring around the internal rotating plate, and user is unable to identify the problem. In this example, the user is unable to identify the problem and queries chatbot 112 using a smartphone, as shown in FIG. 2. In this example, chatbot 112 will ask for the barcode and/or make and model of the microwave. In this example, chatbot 112 will guide the user by displaying visual and graphical instructions using the AR capabilities on the user's smartphone. In this example, the displayed visual and graphic instructions, as shown in FIG. 2, provide step by step instructions (i.e., assigned tasks/activity instructions) directing the user where and how to capture sufficient photographs or video of the microwave (e.g., record microwave running for 10 seconds, record opening and swinging microwave door for 5 seconds, etc.). Chatbot 112 can instruct the user to end the assigned tasks (i.e., provided step by step instructions) by issuing a predetermined voice command or selected a display prompt on computing device 110. FIG. 2 shows screen shot 200 illustrating chatbot 112's interaction with the user via an AR device.

In various embodiments of the present invention, chatbot 112 can notify the user to pair computing device 110 to chatbot 112 in order to provide the user with instructions on how to correct the identified insufficient video or one or more insufficient video portions. In various embodiments of the present invention, chatbot 112 corrects the identified insufficient video or one or more insufficient video portions by instructing the user to capture new sufficient video or images, wherein chatbot 112 issues guidance to the user on how the video should be recorded (i.e., visual guidance). In various embodiments of the present invention, during user interaction with chatbot 112, the user can pair computing device 110, and accordingly chatbot 112 can instruct one more API's to connect to computing device 110. In various embodiments of the present invention, once chatbot 112 is paired with augmented reality glass, then knowledge corpus 114 can display visual guidance, via computing device 110 in order to demonstrate how to capture the video sufficiently. In various embodiments of the present invention, the captured video can be transferred to chatbot 112 on a real-time basis from camera component 108.

In various embodiments of the present invention, chatbot 112 can display visual guidance to the user via computing device 110 (e.g., augmented reality glass). In various embodiments of the present invention, the visual guidance provided to the user comprises generating augmented reality illuminated arrows and/or highlighting objects of interest to visually guide the user. In various embodiments of the present invention, chatbot 112 can control camera component 108 to dictate what is being recorded. For example, instructing the camera to zoom, enhance, add flash, zoom out, etc. The visual guidance provided by chatbot 112 can complete insufficient video feed by controlling camera component 108. In various embodiments of the present invention, user guidance comprises instructing the user: how the video is to be captured. For example, instructing the user to change focus, zoom level, speed of focus movement, capturing a particular area for a predefined time, and directing the user to perform an action while capturing the target area via camera component 108. In various embodiments of the present invention, chatbot 112 can analyze the received video in real-time.

In various embodiments of the present invention, while analyzing the video real-time, chatbot 112 can analyze the object associations in the received video, and can try to validate the object associations in the received video by comparing similar object associations stored and/or previously experienced by knowledge corpus 114. Associated objects can be objects in the target area. More specifically associated objects mean the objects surrounding or associated with a target object. For example, the table is mounted to the wall and the table is vibrating and there are utensils on the table being vibrated, wherein the associated objects are the utensils and the target object is the table. In another example, the microwave oven is causing the heat dissipation.

In various embodiments of the present invention, chatbot 112 can interact with computing device 110 and can display and output visual guidance to capture the video via computing device 110. In various embodiments of the present invention, chatbot 112 can calculate the time a user can focus on a particular area to ensure the particular area is sufficiently captured, chatbot 112 can also show any activity that can be performed by user while he is focusing on the area. In various embodiments of the present invention, chatbot 112 can receive sufficient video feed to analyze the stated or identified problem and accordingly chatbot 112 can provide appropriate suggestion to the identified problem.

Figure 3:
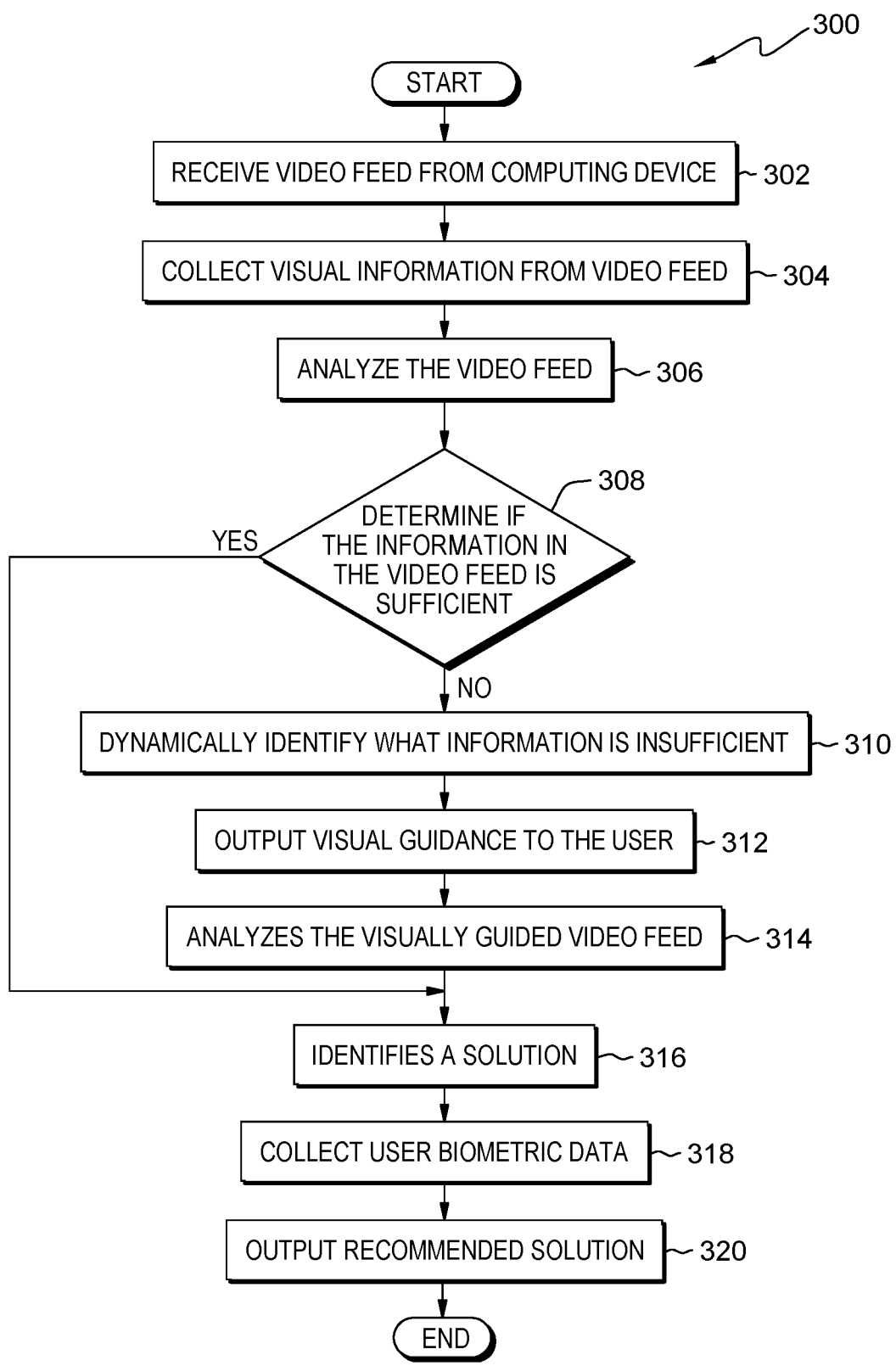
FIG. 3 illustrates operational steps of the AI chatbot component, on a computing device within the distributed data processing environment of FIG. 1, for chatbot interaction through an augmented reality device in accordance with an embodiment of the present invention.

FIG. 3 illustrates operational steps of chatbot 112, generally designated 300, in communication with computing device 110, within distributed data processing environment 100 of FIG. 1, for chatbot interaction through an augmented reality device, in accordance with an embodiment of the present invention. FIG. 3 provides an illustration of one implementation and does not imply any limitations with regard to the environments in which different embodiments can be implemented. Many modifications to the depicted environment can be made by those skilled in the art without departing from the scope of the invention as recited by the claims.

In step 302 chatbot 112 receives a video feed from computing device 110. In various embodiments of the present invention, chatbot 112 can receive one or more video feeds from computing device 110, wherein the one or more video feeds can be live video feeds and/or pre-recorded or delayed video feeds.

In step 304 chatbot 112 analyzes the video feed. In various embodiments of the present invention, chatbot 112 can analyze the received one or more video feeds.

In step 306 chatbot 112 collects visual information from the received video feed. In various embodiments of the present invention, chatbot 112 can identify and collect visual information from the received one or more video feeds based on the video feed analysis.

In step 308 chatbot 112 determines if the information in the video feed is sufficient. In various embodiments of the present invention, chatbot 112 can determine if the visual information identified and/or collected from the video feed is sufficient to identify a problem the user is facing and/or an activity the user can or is performing. In various embodiments of the present invention, if chatbot 112 determines the visual information identified and/or collected from the video feed is sufficient to identify a problem the user is facing and/or an activity the user can or is performing (Yes step) then chatbot 112 can advance to step 216. In various embodiments of the present invention, if chatbot 112 determines the visual information identified and/or collected from the video feed is insufficient to identify a problem the user is facing and/or an activity the user is attempting to perform (i.e., additional visual information is required), (No step), then chatbot 112 can proceed to step 210.

In step 310 chatbot 112 dynamically identifies what information is insufficient from the video feed. In various embodiments of the present invention, chatbot 112 can dynamically identify frames and/or portions of the video feed that are insufficient (e.g., distorted, out of focus, and/or indistinguishable). In various embodiments of the present invention, chatbot 112 can identify additional visual information that is required to fulfill the identified insufficiencies from the received video feed.

In step 312 chatbot 112 outputs visual guidance to the user based on the identified insufficient information. In various embodiments of the present invention, chatbot 112 can generate and output visual guidance instructions to the user based on the identified insufficient information in the video feed. In various embodiments of the present invention, chatbot 112 can provide activity instructions to the user on how to collect additional visual information to fulfill the identified insufficiencies in the form of a new video feed. In various embodiments of the present invention, chatbot 112 can direct the user's visual guidance step by step through assigned tasks (i.e., activity instructions) to fulfill the identified insufficient video feed. In various embodiments of the present invention, chatbot 112 can output and direct the user's visual guidance through computing device 110, wherein chatbot 112 can visually display instructions for the user to follow on computing device 110.

In step 314 chatbot 112 analyzes the visually guided video feed. In various embodiments of the present invention, chatbot 112, via knowledge corpus 114, can analyze the visually guided video feed to fulfill the previously captured and analyze video feed in order to identify one or more solutions to the user problem and/or instructions for the user to perform an activity.

In step 316 chatbot 112 identifies solution to the user's problem. In various embodiments of the present invention, chatbot 112, via knowledge corpus 114, can identify one or more solutions to the user's problem and/or query based on the analyzed. In various embodiments of the present invention, chatbot 112 can receive a user query in the form of a textual and/or audio response from a user. For example, the user states to chatbot 112 that the user wants the bird in the tree directly in front of the user identified or that the user wants instruction on how to replace the headlights on a vehicle.

In step 318 chatbot 112 collects the user's biometric data. In various embodiments of the present invention, chatbot 112 can utilize sensors attached to computing device 110 and/or devices paired to computing device 110 or chatbot 112 to collect the user's biometric data.

In step 320 chatbot 112 outputs a recommended solution based on the analyzed video feed. In various embodiments of the present invention, chatbot 112 can determine if the recommended solution was successful or is working by identifying increases or decreases in the user's biometric data by comparing the user's current biometric data with the user's previously collected biometric data (i.e., historical biometric data). In various embodiments of the present invention, chatbot 112 can prompt the user to confirm the recommended solution solved the identified problem, wherein the prompt is a responsive visual prompt displayed on computing device 110. The user can prompt can be responsive to the user's voice or UI 106. Responsive to determine the recommended solution did not work, chatbot 112 can prompt the user for feedback, wherein the prompt query's the user for more information about the identified problem and/or activity. In various embodiments of the present invention, chatbot 112 can output a secondary recommended solution based on the user feedback.

The collected biometric data. In various embodiments of the present invention, chatbot 112 can output one or more solutions to the user based on the received video feed and/or the visually guided video feed.

Figure 4:
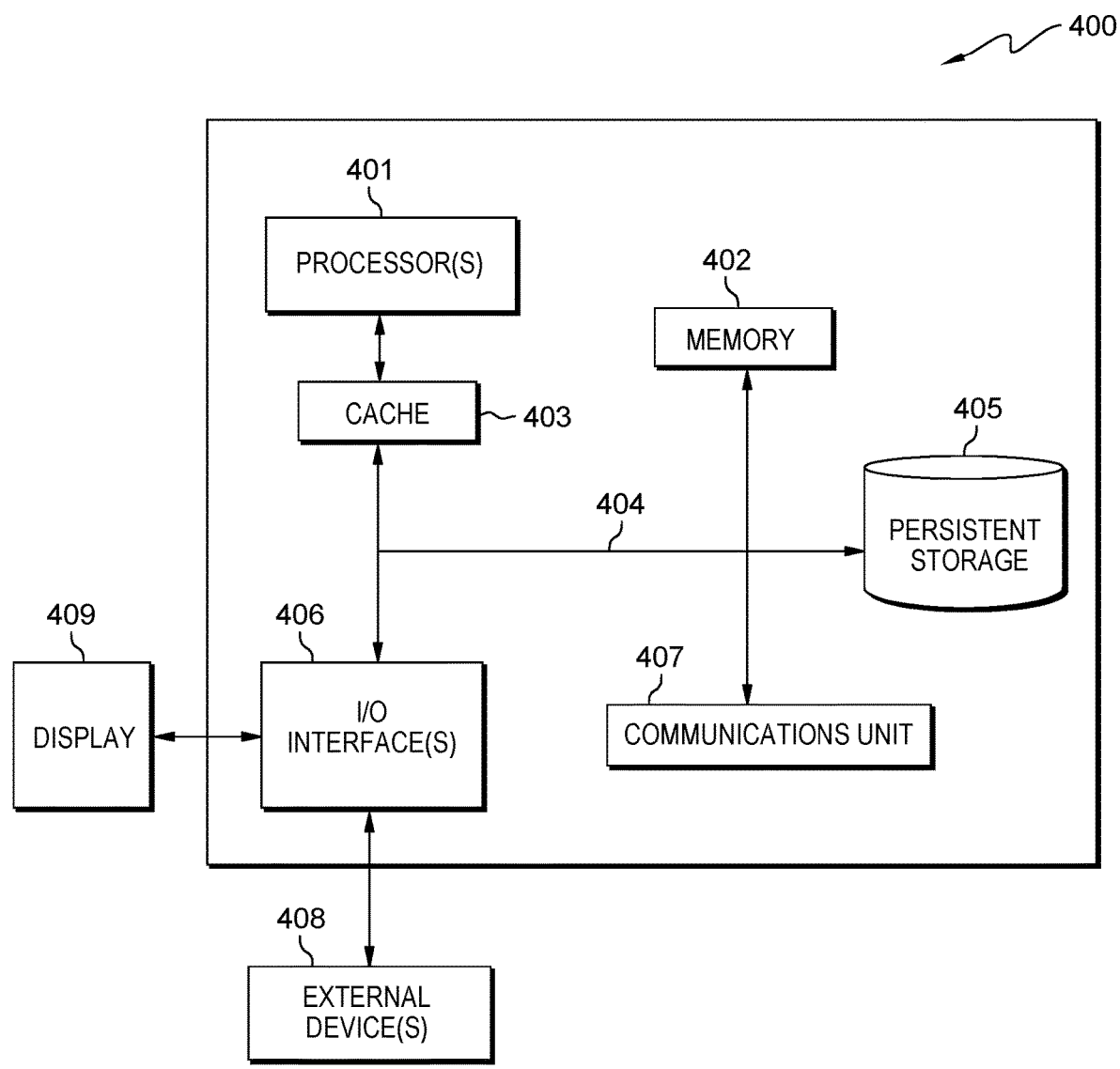
FIG. 4 depicts a block diagram of components of the server computer executing the AI chatbot component within the distributed data processing environment of FIG. 1, in accordance with an embodiment of the present invention.

FIG. 4 depicts a block diagram of components of server computer 120 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

FIG. 4 depicts computer system 400, where computing device 110 represents an example of computer system 400 that includes chatbot 112. The computer system includes processors 401, cache 403, memory 402, persistent storage 405, communications unit 407, input/output (I/O) interface(s) 406, display 409, external device(s) 408 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention can be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 can also be removable. For example, a removable hard drive can be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 can provide communications through the use of either or both physical and wireless communications links. Program instructions and data used to practice embodiments of the present invention can be downloaded to persistent storage 405 through communications unit 407.

I/O interface(s) 406 enables for input and output of data with other devices that can be connected to each computer system. For example, I/O interface 406 can provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for chatbot interaction through an augmented reality device, the method comprising:
    receiving a query from a user including a video feed;
    collecting visual information from the video feed;
    identifying insufficient video content based on video capturing settings, wherein the insufficient video content occurs when video content of at least a portion of the received video is unable to be interpreted, identified, and analyzed;
    remedying the identified insufficient video content by identifying a duration a camera will be focused on a particular area, and a speed at which the user will change visual focus;
    providing activity instructions to the user on how to collect additional visual information in the form of a new video feed to remedy the identified insufficient video content;
    directing an action of the user, via an augmented reality device while the user collects the additional visual information according to the activity instructions;
    identifying, in a knowledge corpus, a recommended response to the query based on the visual information from the video feed and the additional visual information from the new video feed; and
    presenting, via the augmented reality device, the recommended response to the user.

2. The computer-implemented method of claim 1 further comprising:
    collecting biometric data of the user while the user creates the new video feed for identifying the response to the query.

3. The computer-implemented method of claim 1 further comprising:
    visually displaying visual guidance to the user on the computing device as an augmented reality visual display, wherein the augmented reality visual display is illuminated arrows and highlighted objects of interest.

4. The computer-implemented method of claim 1 further comprising:
    receiving user input describing the problem or activity the user wants solved or performed.

5. The computer-implemented method of claim 1 further comprising:
    analyzing the collected biometric while the user performs the recommended solution.

6. The computer-implemented method of claim 1 further comprising:
    determining the recommended solution is working based on biometric data, wherein determining the recommended solution is working comprises:
        identifying increases or decreases in biometric data; and
        prompting the user to confirm the recommended solution solved an identified problem; and
    responsive to determine the recommended solution did not work, prompting the user for feedback and outputting a secondary recommended solution based on the user feedback.

7. The computer-implemented method of claim 6, wherein the recommended solution is a prioritized list based on a knowledge corpus and the recommended solution is retrieved from a database and an online search engine.

8. A computer program product for chatbot interaction through an augmented reality device, the computer program product comprising:
    one or more computer readable storage devices and program instructions stored on the one or more computer readable storage devices, the stored program instructions comprising:
        program instructions to receive a query from a user including a video feed;
        program instructions to collect visual information from the video feed;
        program instructions to identify insufficient video content based on video capturing settings, wherein the insufficient video content occurs when video content of at least a portion of the received video is unable to be interpreted, identified, and analyzed;
        program instructions to remedy the identified insufficient video content by identifying a duration a camera will be focused on a particular area, and a speed at which the user will change visual focus;
        program instructions to provide activity instructions to the user on how to collect additional visual information in the form of a new video feed to remedy the identified insufficient video content;
        program instructions to direct an action of the user, via an augmented reality device while the user collects the additional visual information according to the activity instructions;

program instructions to identify, in a knowledge corpus, a recommended response to the query based on the visual information from the video feed and the additional visual information from the new video feed; and program instructions to present, via the augmented reality device, the recommended response to the user.

9. The computer program product of claim 8 further comprising:

program instructions to collect biometric data of the user while the user creates the new video feed for identifying the response to the query.

10. The computer program product of claim 8 further comprising:

program instructions to visually display visual guidance to the user on the computing device as an augmented reality visual display, wherein the augmented reality visual display is illuminated arrows and highlighted objects of interest.

11. The computer program product of claim 8 further comprising:

program instructions to receive user input describing the problem or activity the user wants solved or performed.

12. The computer program product of claim 8 further comprising:

program instructions to analyze the collected biometric while the user performs the recommended solution.

13. The computer program product of claim 8 further comprising:

program instructions to determine the recommended solution is working based on biometric data, wherein determining the recommended solution is working comprises:

program instructions to identify increases or decreases in biometric data; and program instructions to prompt the user to confirm the recommended solution solved an identified problem; and responsive to determine the recommended solution did not work, program instructions to prompt the user for feedback and outputting a secondary recommended solution based on the user feedback.

14. The computer program product of claim 13, wherein the recommended solution is a prioritized list based on a knowledge corpus and the recommended solution is retrieved from a database and an online search engine.

15. A computer system for chatbot interaction through an augmented reality device, the computer system comprising:

one or more computer processors;

one or more computer readable storage devices;

program instructions stored on the one or more computer readable storage devices for execution by at least one of the one or more computer processors, the stored program instructions comprising:

program instructions to receive a query from a user including a video feed;

program instructions to collect visual information from the video feed;

program instructions to identify insufficient video content based on video capturing settings, wherein the insufficient video content occurs when video content of at least a portion of the received video is unable to be interpreted, identified, and analyzed;

program instructions to remedy the identified insufficient video content by identifying a duration a camera will be focused on a particular area, and a speed at which the user will change visual focus;

program instructions to provide activity instructions to the user on how to collect additional visual information in the form of a new video feed to remedy the identified insufficient video content;

program instructions to direct an action of the user, via an augmented reality device, while the user collects the additional visual information according to the activity instructions;

program instructions to identify, in a knowledge corpus, a recommended response to the query based on the visual information from the video feed and the additional visual information from the new video feed; and program instructions to present, via the augmented reality device, the recommended response to the user.

16. The computer system of claim 15 further comprising:

program instructions to collect biometric data of the user while the user creates the new video feed for identifying the response to the query.

17. The computer system of claim 15 further comprising:

program instructions to visually display visual guidance to the user on the computing device as an augmented reality visual display, wherein the augmented reality visual display is illuminated arrows and highlighted objects of interest.

18. The computer system of claim 15 further comprising:

program instructions to receive user input describing the problem or activity the user wants solved or performed.

19. The computer system of claim 15 further comprising:

program instructions to analyze the collected biometric while the user performs the recommended solution.

20. The computer system of claim 15 further comprising:

program instructions to determine the recommended solution is working based on biometric data, wherein the recommended solution is a prioritized list based on a knowledge corpus and the recommended solution is retrieved from a database and an online search engine, wherein determining the recommended solution is working comprises:

program instructions to identify increases or decreases in biometric data; and program instructions to prompt the user to confirm the recommended solution solved an identified problem; and responsive to determine the recommended solution did not work, program instructions to prompt the user for feedback and outputting a secondary recommended solution based on the user feedback.

* * * * *